US006796012B2

United States Patent
Geissler et al.

(10) Patent No.: US 6,796,012 B2
(45) Date of Patent: Sep. 28, 2004

(54) MILLING MACHINE FOR CARRYING OUT MILLING AND TURNING OPERATIONS ON ROD MATERIAL

(75) Inventors: Alfred Geissler, Pfronten (DE); Karl Lechleiter, Oy-Mittelberg (DE); Reinhold Seitz, Hopferau (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 54 days.

(21) Appl. No.: 10/370,880

(22) Filed: Feb. 21, 2003

(65) Prior Publication Data

US 2003/0177623 A1 Sep. 25, 2003

(30) Foreign Application Priority Data

Feb. 25, 2002 (DE) .......................................... 102 07 970

(51) Int. Cl.[7] .............................. B23P 23/02; B23C 1/12; B23C 1/14
(52) U.S. Cl. .......................... 29/27 C; 29/27 A; 29/560; 409/166; 409/167; 409/235; 409/240; 409/201
(58) Field of Search ............................... 29/27 C, 27 R, 29/27 A, 560; 409/165–167, 242, 240, 235, 201, 211

(56) References Cited

U.S. PATENT DOCUMENTS

| 3,712,175 A | * | 1/1973 | Muller et al. | 409/211 |
| 4,566,169 A | * | 1/1986 | Vesely | 29/27 A |
| 4,785,525 A | * | 11/1988 | Ishida et al. | 29/27 R |
| 5,117,552 A | * | 6/1992 | Babel | 409/235 |
| 5,301,405 A | * | 4/1994 | Maker | 409/240 |
| 5,346,343 A | * | 9/1994 | Babel | 409/201 |
| 5,634,250 A | * | 6/1997 | Mihailovic | 409/235 |
| 5,727,296 A | * | 3/1998 | Kobler | 29/27 C |
| 5,885,199 A | * | 3/1999 | Shao | 29/27 C |
| 6,364,818 B1 | * | 4/2002 | Chen | 29/27 R |
| 6,393,687 B1 | * | 5/2002 | Friedrich | 29/560 |
| 6,675,451 B1 | * | 1/2004 | Miyano | 29/27 C |

FOREIGN PATENT DOCUMENTS

| DE | 196 33 899 | | 2/1998 |
| DE | 197 39 512 | | 3/1999 |
| DE | 199 18 082 | | 11/2000 |
| EP | 192221 A2 | * | 8/1986 |
| EP | 0 368 996 | | 5/1990 |
| EP | 0 949 029 | | 10/1999 |
| EP | 1 122 023 | | 8/2001 |
| GB | 2215251 A | * | 9/1989 |
| JP | 3-35905 A | * | 2/1991 |
| WO | WO 98/08648 | | 3/1998 |

* cited by examiner

Primary Examiner—Erica Cadugan
(74) Attorney, Agent, or Firm—The Maxham Firm

(57) ABSTRACT

A milling and drilling machine for rod-shaped material. A motor-driven spindle head is movable on a column along a first coordinate axis and includes a work spindle capable of selectively accommodating milling and turning tools. A separating device transversely separates the rod-shaped material. A clamping device, disposed laterally alongside the workspace, has a workpiece holder with a clamping axis along a horizontal coordinate axis. A rotary drive is provided for the workpiece holder. The spindle head is pivotable about a Y axis at the front side of a headstock movable in the direction of the Y coordinate axis. The headstock is disposed on a motor-driven slide movable on the stationary column along an X coordinate axis parallel to the workpiece clamping axis. The clamping device is disposed on an inclined console located on the face of the column and movable along the Z coordinate axis in guides.

10 Claims, 4 Drawing Sheets

MILLING MACHINE FOR CARRYING OUT MILLING AND TURNING OPERATIONS ON ROD MATERIAL

BACKGROUND OF THE INVENTION

1. Field of the Invention

The invention relates to a milling machine for milling and turning rod material into individual workpieces.

2. Discussion of Related Art

Various machine tools for milling and drilling workpieces are known. The principal advantage of these machines is that the workpieces can remain on the same table and in one setting for different milling and drilling operations. As a result, machining accuracy is increased and the overall sequence of operations is simplified, since the number of clamping operations is reduced.

One type of such machine tool is related to turning machines due to its basic concept, and is applicable to workpieces which are mainly processed by turning operations. For accomplishing special isolated milling operations, spindle heads may be provided as auxiliary devices at appropriate locations in these turning machines.

Another type of machine tool for carrying out milling and turning operations on workpieces is based on the technical concept of milling machines, which differ from turning machines in having a greater number of shifting axes. These machines comprise a spindle head with an integrated tool spindle, which is typical for milling machines. It is mounted on a column so as to be shiftable along one or more coordinate axes by means of a motor. A clamping device is provided on a workpiece table, which comprises a workpiece holder for fixedly mounting usually rod-shaped workpieces of different sizes that are inserted into the workpiece holder from an adjacent rod magazine. In machine tools of this type, the milling operations outnumber the turning operations carried out on the same workpieces.

PCT publication 98/08648 shows a general milling machine for milling and turning rod material into individual workpieces. The machine has a machine bed and a mobile column shiftable along the two horizontal X and Y coordinate axes. On the vertical front side of the mobile column, a motor driven vertical slide carrying a spindle head, including a vertical work spindle, is guided so as to be movable along the vertical Z coordinate axis. On the machine bed a workpiece carrier having a clamping device, such as a draw-in collet or a multiple jaw chuck, as well as a rotary drive coupled therewith, is provided on a stationary table laterally adjacent to the workspace of the tool spindle. The clamping device defines a clamping axis along which the rod-shaped workpieces are fed in a step-wise manner. The clamping device can further be pivoted about an axis extending transversely with respect to the clamping axis in two bearing blocks attached to the machine bed or the table. The table is formed as a turntable. The numerically controlled rotary drive can drive the workpiece holder with speeds suitable for turning operations. These speeds can be, for example, about 4000 rpm to about 6000 rpm. In this machine tool the workpiece end portions protruding from the workpiece holder into the workspace can be subjected to turning operations with the aid of the work spindle in the conventional way. To carry out milling operations, particularly at the end portions of the workpiece, in the same setting, the workpiece previously is separated from the rod material and fixed in the workpiece holder, and can be inclined by pivoting the workpiece holder so that even the workpiece end portions can be machined, for example rounded, with the aid of the vertical milling tool.

From European patent 0,368,996, a similar milling machine for carrying out milling and turning operations on a workpiece is shown, in which a vertical spindle head including a milling spindle is provided on a movable column so as to be movable along the vertical Z coordinate axis. A gripping and pivoting unit is located on a slide that can be independently shifted horizontally in the longitudinal direction of the machine column. It provides for clamping a rod portion, the front end of which has already been machined. With a pivoting movement of the gripping and pivoting unit about a horizontal axis the rear side of the workpiece may be machined from different directions by the vertical milling tool.

A turning and milling machine for machining workpieces of wood, plastic and metal having a vertical slide shiftable on the face of a stationary machine column along the vertical Z axis and having a spindle head mounted thereon, is shown in German patent publication 197 39 512. In front of the face of the column and laterally adjacent to the workspace of the vertical work spindle, a clamping device is provided which is turnable by means of a motor. The rod-shaped material to be machined into individual workpieces is mounted in the clamping device. The clamping axis of the clamping device extends along the horizontal X coordinate axis. However, milling the rod end portions protruding from the clamping device from all directions is not possible with this machine.

German patent publication 196 33 899 shows another machine tool for machining rod-shaped workpieces. It has a machining head adjustable in a plurality of coordinate axes for machining a free end portion of the workpiece, as well as a clamping device including an integrated retainer for the rod-shaped workpieces. The end portions of the workpieces can be machined from five sides by laterally pivoting the clamping element holding the respective workpiece. The machining head containing the horizontally oriented tool spindle may be adjustable on a rotatable turntable in three axes.

Finally, a universal machine tool for accomplishing milling and turning operations on larger workpieces is shown in German patent publication 199 18 082. This universal machine tool carries a slide that is movable on a bed extending to the front in a direction transverse to the front side of the movable column in the longitudinal direction of the bed. A rotatably driven, relatively large turntable is provided on the slide. On the front side of the shiftable column a vertically movable console is provided. The end face of the console is inclined downward at an angle of about 45°. A pivoting head with a work spindle is disposed on the end face of the console. With a rotation of the swivel head about the axis perpendicular to its bearing surface, the work spindle can be moved from a vertical operating posture into a horizontal posture, or vice versa.

SUMMARY OF THE INVENTION

It is one object of the invention to provide a milling machine for machining rod-shaped materials into individual workpieces. The machine has a simplified structure as compared to previous machines and it enables universal all-over milling and turning of the protruding rod end portions into individual workpieces.

According to the invention, the stated object is accomplished by mounting the spindle head on a horizontal slide so as to be pivotable about an axis perpendicular to the spindle axis. The motor-driven horizontal slide is movable on the stationary column along the X coordinate axis parallel to the clamping axis. The clamping device comprises a rotary drive of dimensions suitable for turning operations and is disposed on an inclined console located on the face of the column laterally adjacent to the workspace and is movable in guides along the vertical Z coordinate axis by means of a motor.

As the spindle head may be pivoted about its longitudinal axis, the spindle head may be fixed in pre-selected inclined postures so that a rotatably driven milling tool mounted in the tool spindle may, for example, produce transverse grooves or inclined bores in the protruding end portion of the workpiece. However, the spindle head can also carry out a predetermined pivoting movement during a machining operation, so that, for example, round or spherical surfaces may be formed at the end portion of the workpiece with the correspondingly selected milling tool. Likewise the possible inclined postures of the spindle head, and thus the work spindle, enable certain turning operations, for example, the production of undercuts, if a turning tool is mounted in the spindle and the workpiece disposed in the clamping device is rotated with the speed required for this operation by its rotary drive. The provision of the spindle head on a horizontal slide shiftable on the stationary column results in a sufficient number of shifting paths along the coordinate axis parallel to the workpiece axis. Thus, the workpieces may be machined with an inclined tool in all of the workspace, and the tool exchange of the milling and turning tools from at least one magazine may be carried out according to the pick-up principle in a simple manner and within relatively short periods of time. The inclined console is vertically movable along column guides and has the clamping device disposed on its top laterally displaced with respect to the vertical guides. The inclined console is functionally connected with the capability of tilting the tool. In this manner the workpiece holder is located directly adjacent to the work area so that the protruding end portions of the workpiece are securely fixed. On the other hand, the insertion end of the clamping device protrudes laterally beyond the machine column so that the rod-shaped material can be inserted into the clamping device in a simple manner, for example, from a rod magazine.

Advantageously, the magazine may be disposed and mounted to the column on the side of the workspace opposed to the clamping device. The predetermined tool exchange position is directly accessible with a movement of the spindle head on the column. The free space required for the provision of the tool magazine is ensured by the fact that the inclined console can only be vertically moved. The invention provides a machine tool with universal applicability and relatively small dimensions.

The universal applicability of the machine tool according to the invention is considerably enhanced by its table construction. This table is provided in front of the face of the column and below the workspace. It comprises at least one bolster plate on which an auxiliary element, for example a tailstock, a workpiece turning device, a measuring instrument or the like, may be mounted. This table construction together with its base is conveniently formed as an integral, highly rigid component which includes the inclined console carrying the clamping device and is movable in the vertical guides of the machine column. In one embodiment, the table construction is provided with a vertical front bolster plate, as well as a horizontal bolster plate, each having flutes in which different auxiliary devices may be selectively mounted.

The machine tool according to the invention incorporates the known advantages of a universal milling machine with those of a turning machine. The respectively required turning and milling tools may be automatically inserted into the multi-axially turntable work spindle within a few seconds. The machine tool according to the invention is particularly suitable for the production of shorter, more complex workpieces, including inclined or spherical surfaces, grooves, bores, or the like from rod-shaped materials having a relative large diameter. The milling operations should, however, outnumber the turning operations.

BRIEF DESCRIPTION OF THE DRAWING

Further particularities and advantages of the invention will become clear from the following description of preferred embodiment, with reference to the drawing, in which.

DETAILED DESCRIPTION OF THE PREFERRED EMBODIMENTS

Figure 1:
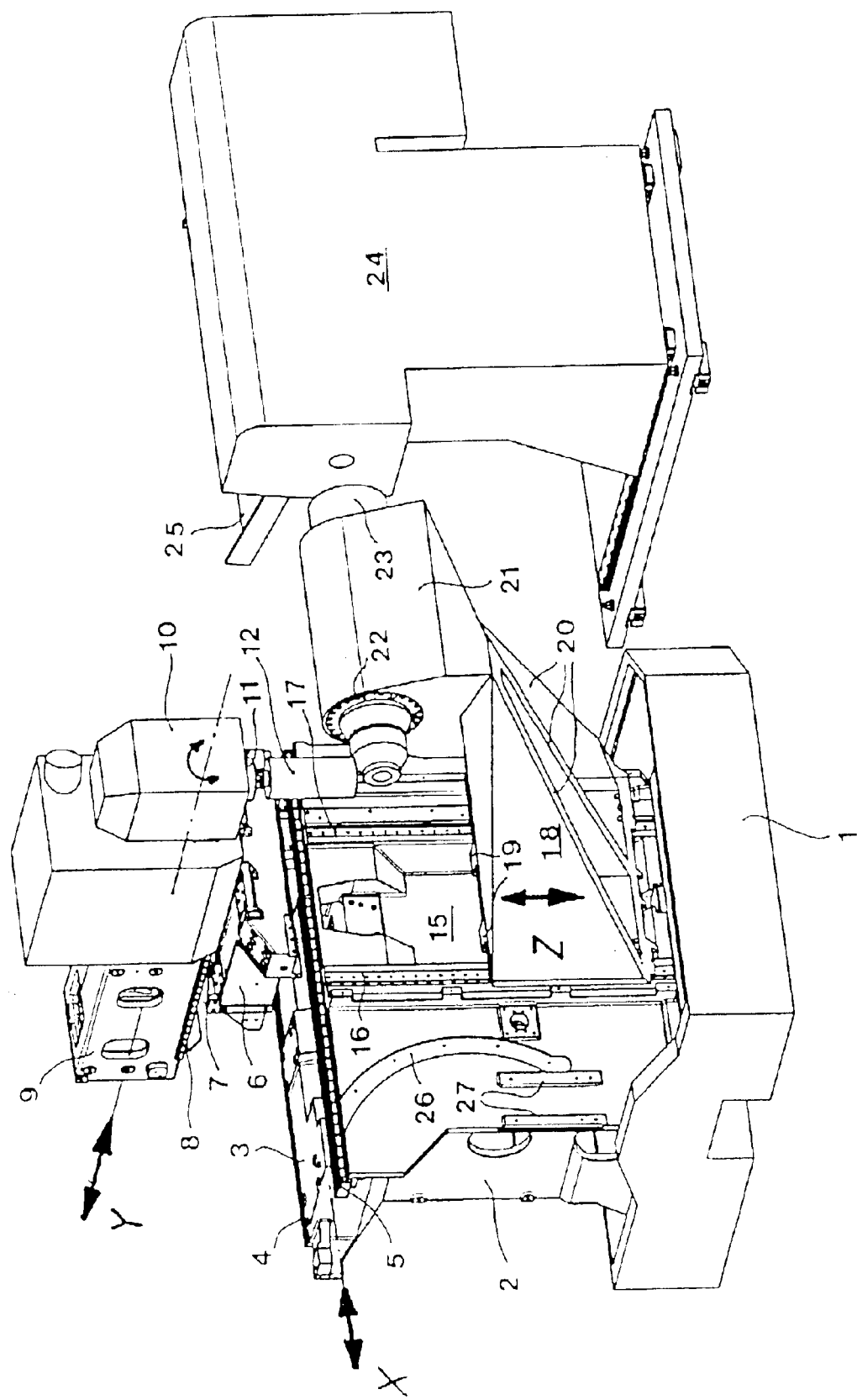
FIG. 1 is a perspective view of a milling and drilling machine according to the invention designed for turning operations.
Figure 2:
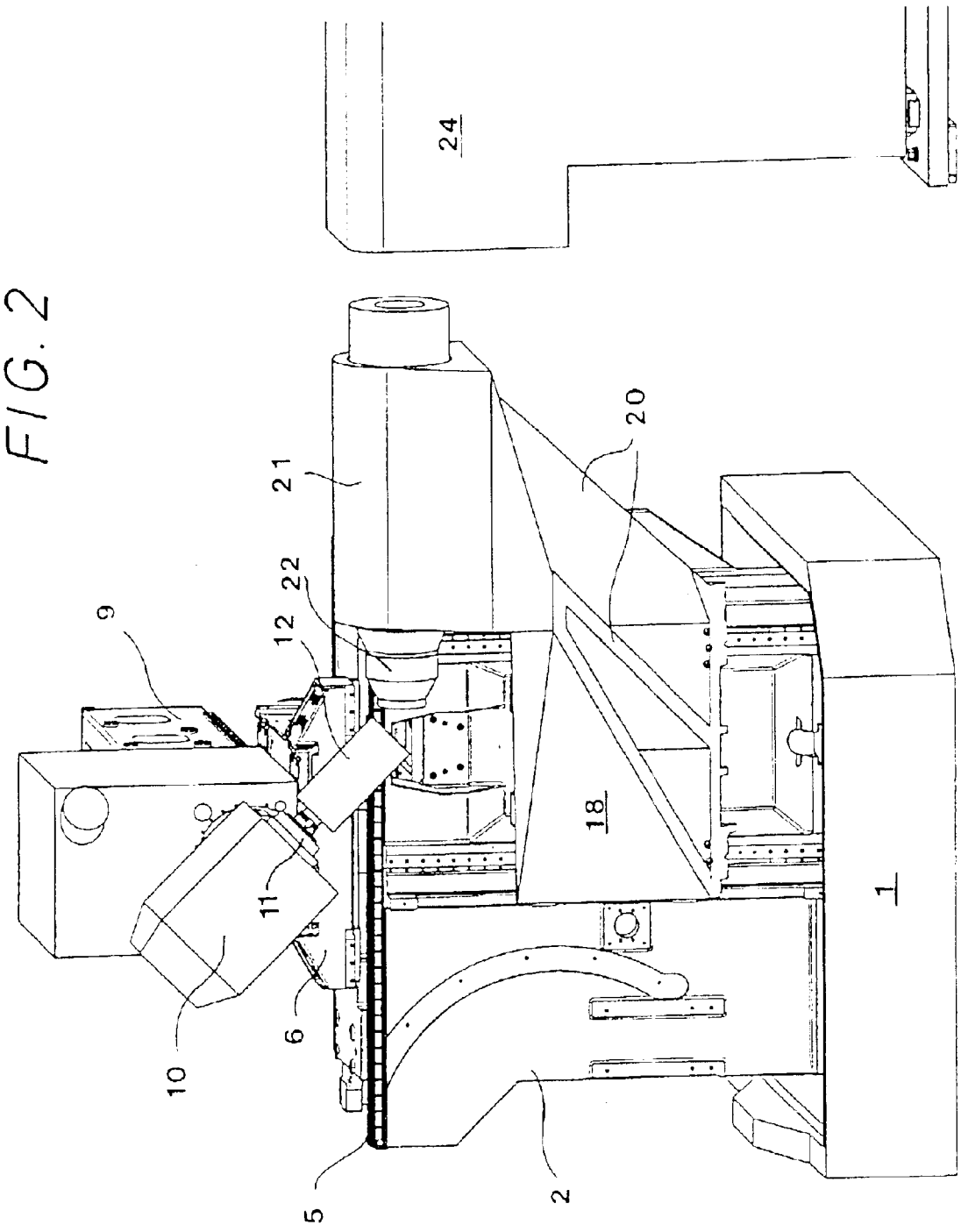
FIG. 2 is a perspective front view of the machine according to FIG. 1 with the work spindle inclined.

The milling and drilling machine shown in FIGS. 1 and 2 comprises base 1 formed as a stable pan, on the rear portion of which is rigidly mounted inherently stable machine column 2 with approximately rectangular outer dimensions. On the substantially plane top surface 3 of column 2, two edge-side guiding rails 4 and 5 extend along the X coordinate axis. Slide 6, carrying guide shoes 7 on its upper side, is movably guided in these two guiding rails. In guide shoes 7, guide rails 8 attached to the bottom side of headstock 9 are running so that motor-driven headstock 9 can be moved along the Y coordinate axis. On the face of the headstock, spindle head 10 is provided having work spindle 11 to which milling or drilling tool 12 or a turning tool, such as a lathe tool, can be selectively mounted. For carrying out milling operations a conventional rotary drive (not shown) is provided in spindle head 10. The work spindle may also be a so-called high-speed spindle (with speeds of 10,000 rpm or greater). In addition, for carrying out turning operations, fixing means securely preventing a rotation of a mounted turning tool about its longitudinal axis are integrated in spindle head 10. In the embodiment shown, milling tool 12 is mounted in work spindle 11.

As can be seen in FIG. 2, spindle head 10 can be pivoted about a Y coordinate axis so that the respectively mounted tool 12 may take arbitrary inclined postures efficient for carrying out certain operations. In addition to transverse drilling operations with a fixed tool position, spherical surfaces may, for example, be produced by a continuous swinging movement. A horizontal tool posture is also possible.

Column 2, formed as an inherently stable frame structure, has recess 15 in its central portion (see FIG. 1). Vertical guide rails 16 and 17, on which the dimensionally stable rear wall of inclined console 18 is guided via corresponding guide shoes (not shown) so as to be vertically movable, are attached to the front corner portions of the column portions defining recess 15. Rear shoulders 19 of the inclined console are in engagement with recess 15. Console 18 includes stiff struts 20 which extend laterally forward and upward, projecting laterally above the rear wall and forming a highly stiff support structure for clamping device 21. Tool holders, such as collet chucks or jaw chucks 22, are integrated in the clamping device for fixing a rod-shaped workpiece inserted through outer end 23 of the clamping device into the continuous cavity up to tool holder 22 in its machining position with its end portion protruding.

Clamping device 21 is further provided with a built-in rotary drive which provides the rotation of workpiece holder 22 and the workpiece mounted therein required for a turning operation under the program control of the machine tool. The rotary drive may have larger dimensions than a conventional one due to the highly stiff support and mounting of clamping device 21 on the inclined console, so that even cruder turning operations may be carried out. During milling operations the rotary drive may slowly rotate workpiece holder 22, and thus the mounted workpiece, or adjust and fix them in predetermined angle ranges by means of partial rotations.

In the machine tool shown, rod magazine 24, including rod inlet 25, is allocated which enables a rapid workpiece supply to the clamping device, which can be automated.

Still referring to FIGS. 1 and 2, on the left front side of column 2 are provided mounts 26 for a protective cover formed as a bent sheet for a tool magazine. This tool magazine may either be integrated in base 1 or attached to supports 27 of column 2.

The operation and the individual features of the milling machine according to the invention will be easily understood by contemplating the illustrated embodiments. In the vertical orientation of tool 12 shown in FIG. 1, milling operations can be carried out on an end portion of a rod-shaped workpiece protruding from workpiece holder 22.

With reference to the embodiment shown in FIG. 2, inclined tool 12 can carry out special milling operations at the end surfaces of the workpiece—not shown here—to produce, for example, inclined, ring-shaped surfaces or, after inserting a new tool, inclined bores. In a corresponding manner, a turning tool previously mounted in the work spindle may, for example, produce recesses having inclined surfaces, ring-shaped undercuts, or the like.

Figure 3:
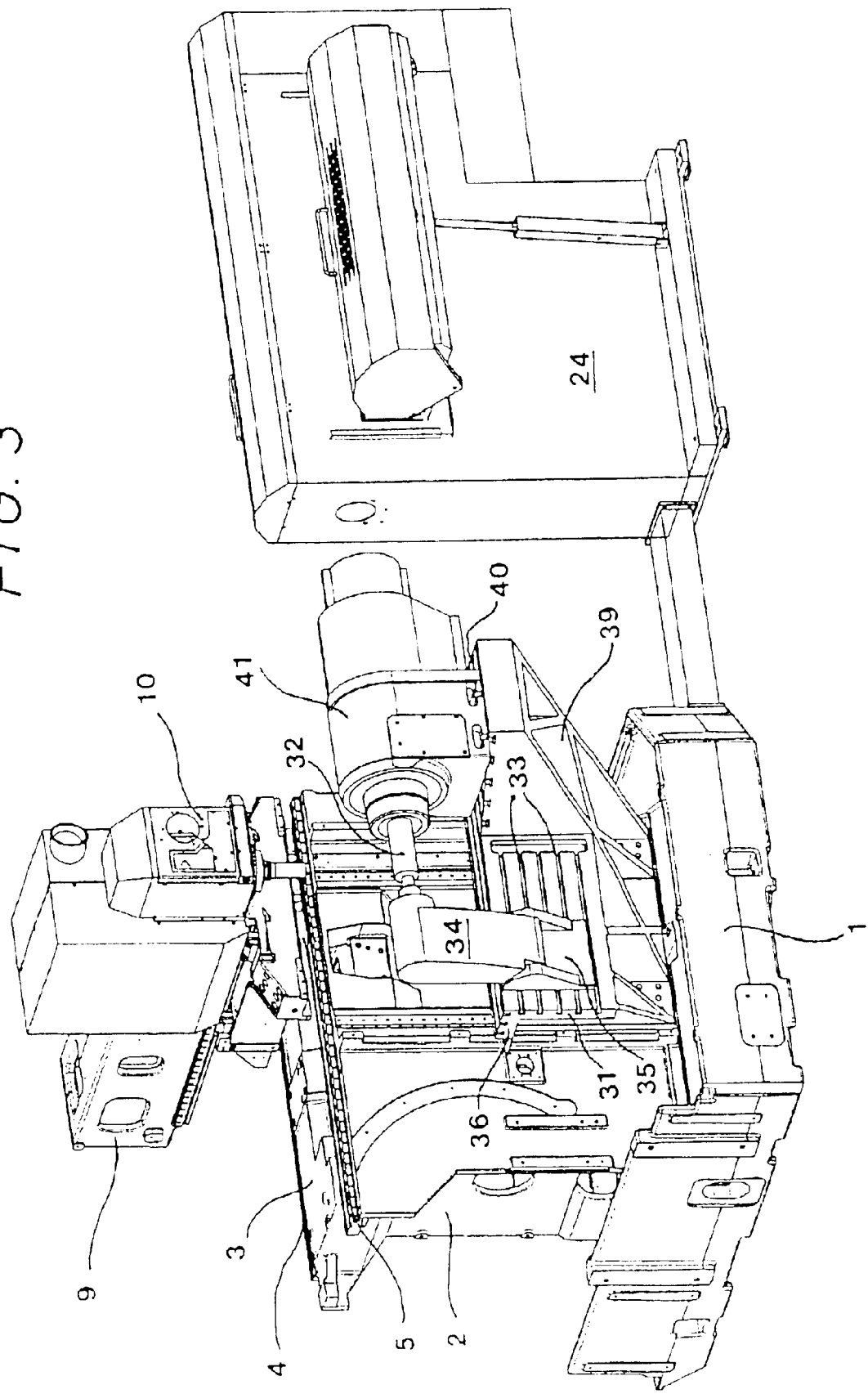
FIG. 3 is a perspective view of another embodiment of the invention where the table includes a vertical and a horizontal bolster plate.
Figure 4:
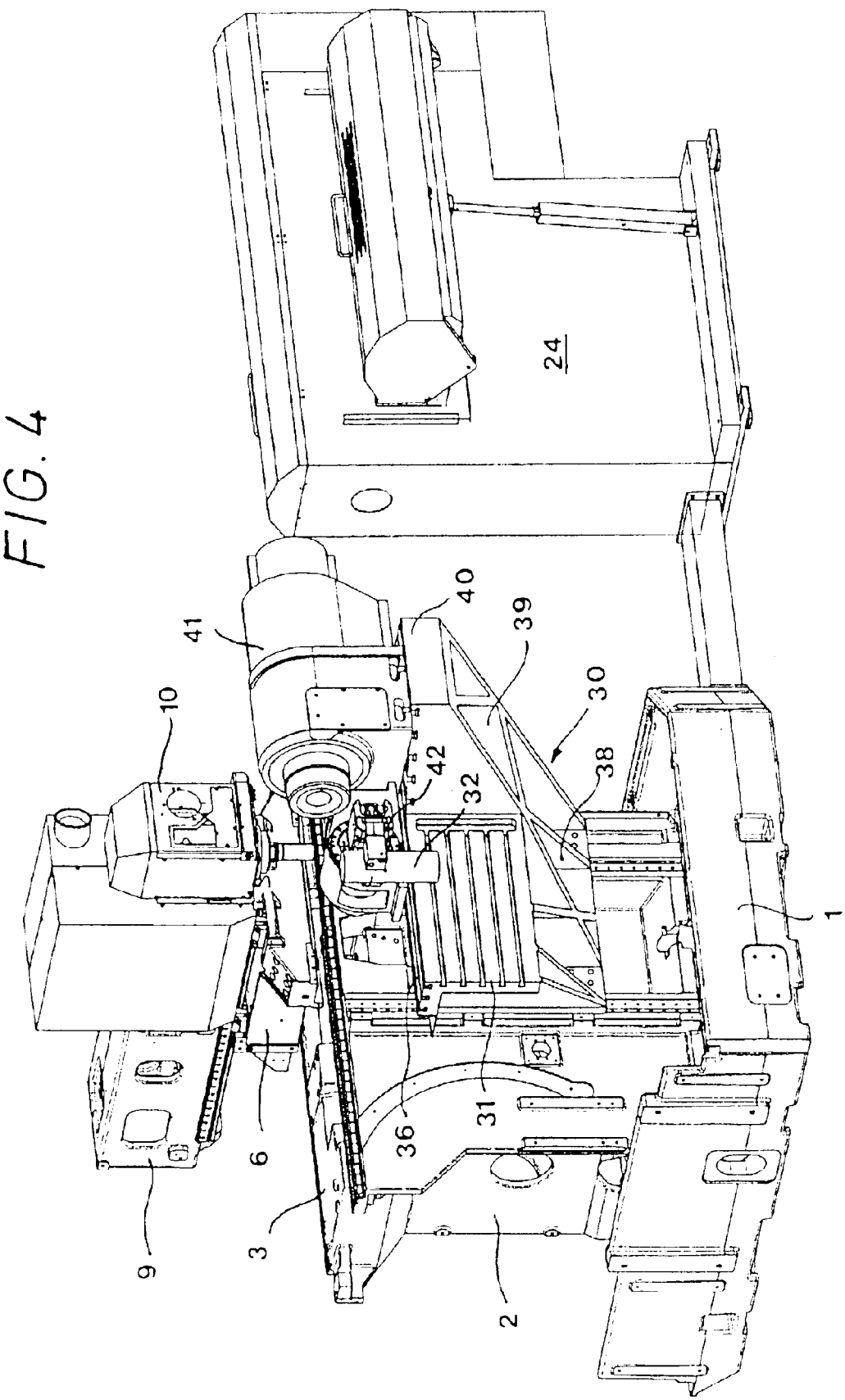
FIG. 4 is a perspective view of another embodiment of the invention where the table includes a vertical and a horizontal bolster plate and an auxiliary device.

The arrangement of the machine tool shown in FIGS. 3 and 4 corresponds generally to the embodiment described above, and corresponding components are indicated by the same numerals. There are differences with respect to the design of the inclined console. For example, part of table construction 30 (FIG. 4) that is movable on the column in vertical guide rails 16 and 17 is different. Table construction 30 includes vertical front bolster plate 31 having flutes extending horizontally and parallel to the longitudinal axis of rod-shaped material 32 to be machined. On this vertical bolster plate a suitable auxiliary device, for example, pivotable tailstock 34 shown in FIG. 3, including its base 35, can be disposed and detachably fixed in a continuously selectable distance to the workpiece. This table construction further comprises upper horizontal bolster plate 36 connected to vertical bolster plate 31. The flutes of the horizontal bolster plate are parallel to the flutes of the vertical bolster plate. On the horizontal bolster plate may be mounted auxiliary device 42 (FIG. 4), such as a workpiece turning device. Bolster plates 31 and 36 may be formed of an integral angle plate or of two individual plates. Both bolster plates 31 and 36 are mounted on front portion 38 of the console integrally blending with inclined console 39.

This inclined console is provided with upper bolster plate 40 having axially parallel flutes which, in this case, extend on the same level as the flutes of horizontal bolster plate 36. Bolster plate 40 may be formed integrally with horizontal bolster plate 36 or it may be provided separately. Clamping device 41 is mounted on bolster plate 40, which corresponds to clamping device 21 of FIGS. 1 and 2 with regard to function and operation.

While the present invention has been illustrated and described by means of specific embodiments, it is to be understood that numerous changes and modifications can be made therein without departing from the spirit and scope of the invention. Accordingly, the invention is limited only by the claims.

What is claimed is:

1. A milling and turning machine for operating upon and turning a rod-shaped material into individual workpieces, said machine comprising:

a motor-driven spindle head and headstock movable on a stationary column along a first horizontal Y coordinate axis, said spindle head including a work spindle capable of selectively accommodating milling tools and turning tools;

separating means for transversely dividing the rod-shaped material;

a clamping device disposed on a console including at least one side composed of reinforcing struts that are inclined with respect to horizontal and vertical axes and with respect to each other, said console located on a vertical face of the stationary column and movable along a second coordinate axis substantially perpendicular to the Y axis, said second axis being called the Z coordinate axis, and said clamping device also disposed laterally adjacent to the workspace, said device comprising:

a workpiece holder having a clamping axis extending along a horizontal coordinate axis; and a rotary drive for rotating the workpiece holder about the clamping axis; and a motor-driven slide supporting the headstock, said slide movable on the stationary column along an X coordinate axis parallel to the clamping axis and substantially perpendicular to the Y and Z axes, the spindle head being pivotable about an axis extending in the Y direction at a side of the headstock.

2. The milling and turning machine of claim 1, wherein a mount for a protective cover for a tool magazine is provided on a side of the workspace opposed to the clamping device.

3. The milling and turning machine of claim 1, wherein the console further comprises a dimensionally stable rear portion that is guided in vertical rails disposed at both sides of a central recess formed in the column.

4. The milling and turning machine of claim 3, wherein the reinforcing struts extend transversely upward and forward from the rear side of the console.

5. The milling and turning machine of claim 4, wherein the console is integrally formed with a housing of the clamping device.

6. The milling and turning machine of claim 4, wherein the clamping device is mounted on the console as a separate assembly.

7. The milling and turning machine according to claim 4, wherein the console is part of a table construction which further comprises at least one additional bolster plate for detachably mounting an additional element.

8. The milling and turning machine according to claim 1, wherein the console is part of a table construction which further comprises at least one additional bolster plate for detachably mounting an additional element.

9. The milling and turning machine according to claim 8, wherein the table construction comprises a vertical bolster plate and a horizontal bolster plate.

10. The milling and turning machine of claim 1, wherein the clamping device is mounted on the console as a separate assembly.

* * * * *